United States Patent

Hampton et al.

[11] Patent Number: 5,095,857
[45] Date of Patent: Mar. 17, 1992

[54] SELF ACTUATOR FOR CAM PHASERS

[75] Inventors: Keith Hampton, Ann Arbor; Roger P. Worthen, Farmington Hills, both of Mich.

[73] Assignee: Eaton Corporation, Cleveland, Ohio

[21] Appl. No.: 553,932

[22] Filed: Jul. 17, 1990

[51] Int. Cl.$^5$ ............................................. F01L 1/34
[52] U.S. Cl. ............................ 123/90.17; 123/90.31; 464/1
[58] Field of Search ............... 123/90.15, 90.17, 90.31; 464/1, 57, 59, 60, 160

[56] References Cited

U.S. PATENT DOCUMENTS

| | | | |
|---|---|---|---|
| 3,626,720 | 12/1971 | Meacham et al. | 64/25 |
| 4,754,727 | 7/1988 | Hampton | 123/90.15 |
| 4,762,097 | 8/1988 | Baker | 123/90.17 |
| 4,787,345 | 11/1988 | Thoma | 123/90.17 |
| 4,841,924 | 6/1989 | Hampton et al. | 123/90.17 |
| 4,862,843 | 9/1989 | Kawamoto et al. | 123/90.11 |
| 5,031,585 | 7/1991 | Muir et al. | 123/90.17 |
| 5,040,651 | 8/1991 | Hampton et al. | 123/90.15 |

FOREIGN PATENT DOCUMENTS 2217812 11/1989 United Kingdom .
2221513 2/1990 United Kingdom .

*Primary Examiner*—E. Rollins Cross
*Assistant Examiner*—Weilun Lo
*Attorney, Agent, or Firm*—F. M. Sajovec

[57] ABSTRACT

A device (10) for varying the angular phase relationship between a camshaft (12) and a crankshaft (not shown) in response to a control signal including a drive member (18) rotating synchronously with an engine crankshaft, a driven member (16) synchronously rotating with the camshaft on a common axis with the drive member. A coupling assembly (42) interlinks the two members and includes an actuator element (76) positionable to selectively vary the phase relationship between the members. An energy storage mechanism (100) including an inertia member (106) and a spring (104) converts kinetic energy from transitory speed differentials between the driven and inertia members to potential energy for selective release by a latch mechanism (144) in driving connection between the energy storage mechanism and the actuator element.

15 Claims, 3 Drawing Sheets

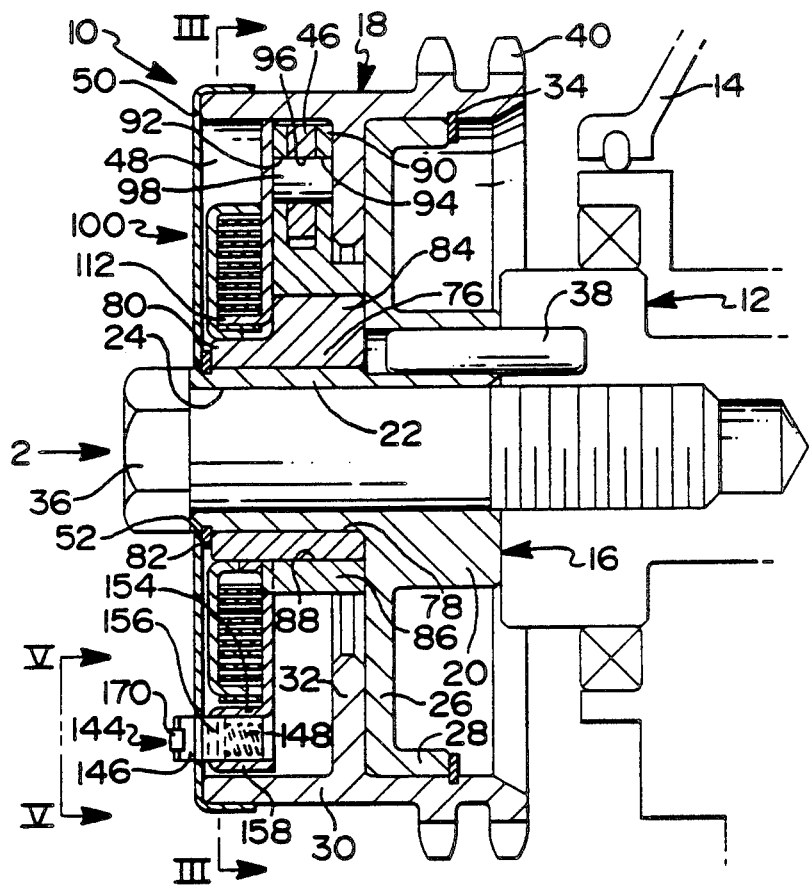
FIG 1
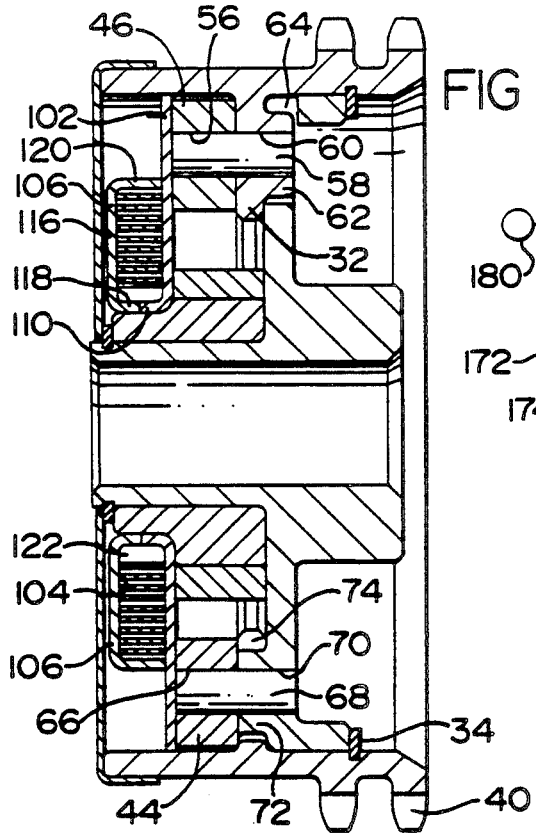
FIG 4
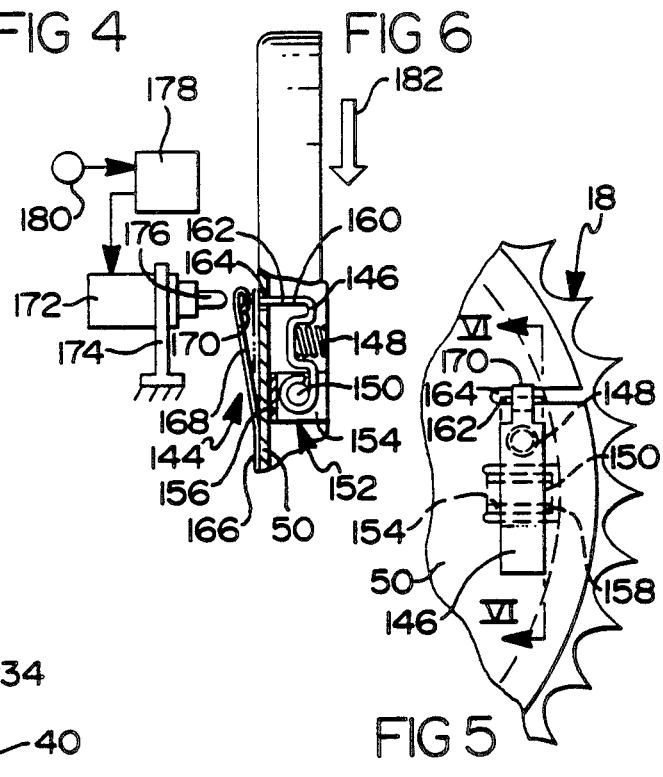
FIG 6
FIG 5

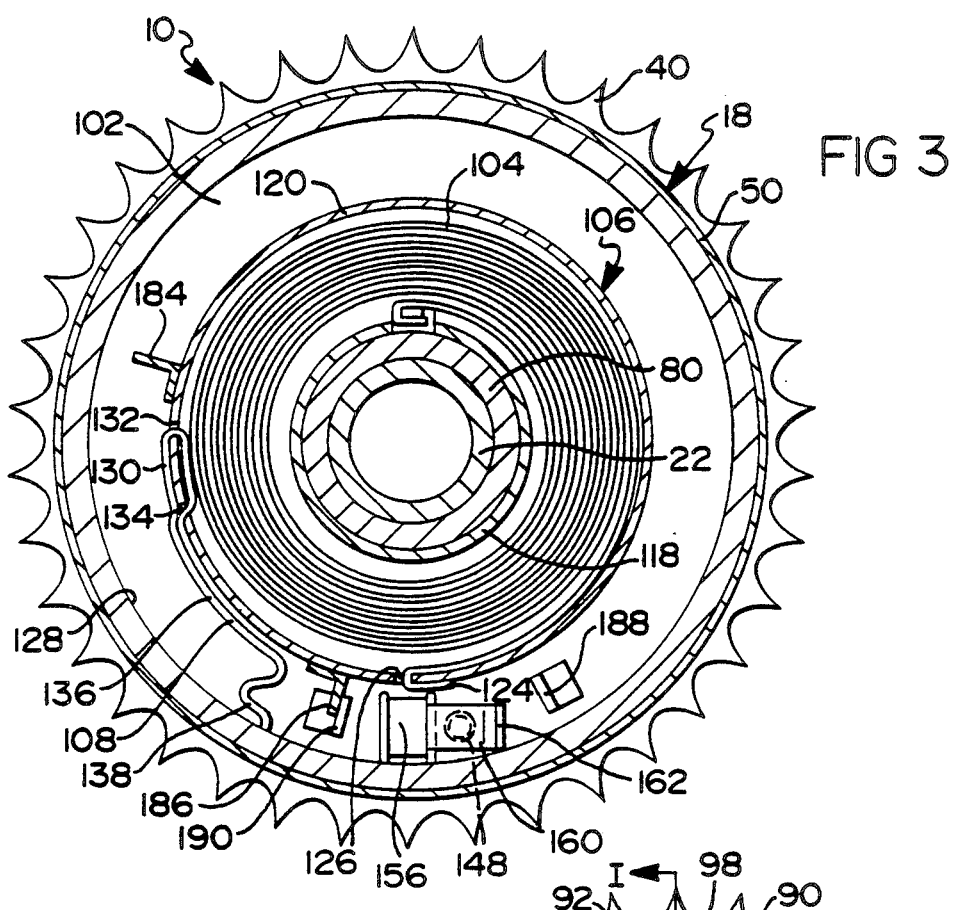
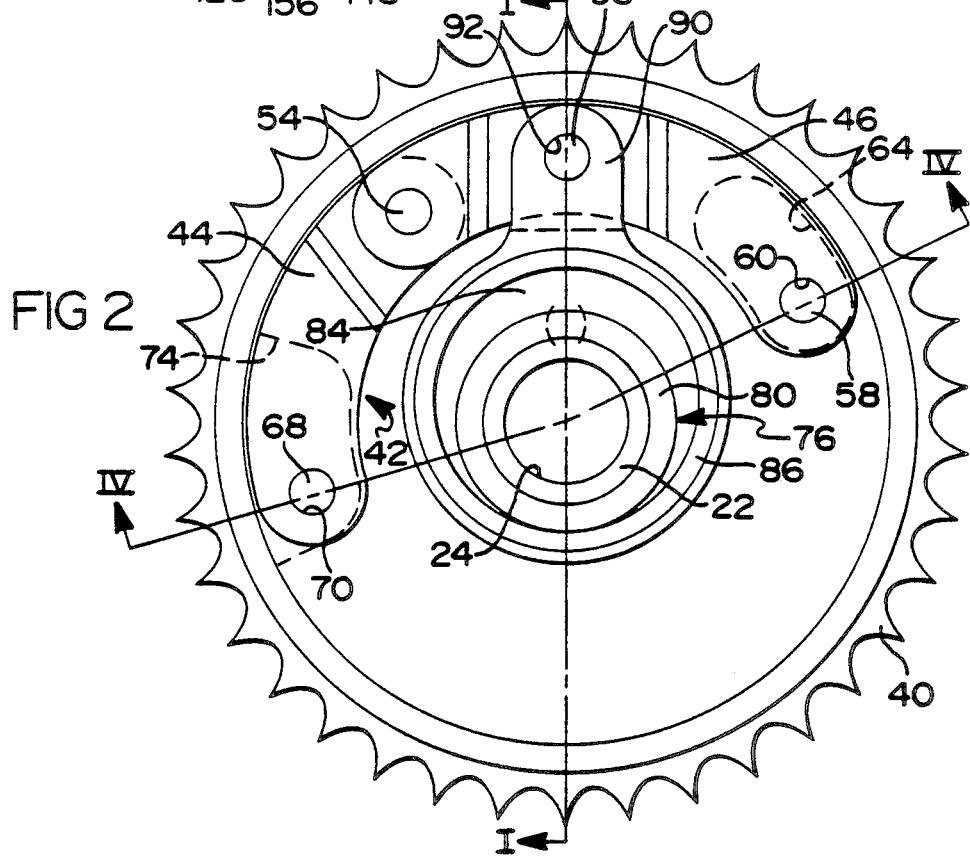

SELF ACTUATOR FOR CAM PHASERS

CROSS REFERENCE

The subject matter of this invention is related to that of U.S. application No. 554,033, filed on even date herewith, Now U.S. Pat. No. 5,040,651, entitled "Self Actuating CAM Phaser with Sprag Clutch" by Keith Hampton and Roger P. Worthen.

Field of the Invention

This invention relates to a device for varying the angular phase relation between two rotating shafts. More specifically, the invention relates to such a device adapted to vary the angular phase relation between a camshaft and a crankshaft of an internal combustion engine.

Background of the Invention

Devices for varying or changing the angular phase relation or timing between an engine camshaft and a crankshaft are well known, as may be seen by reference to U.S. Pat. Nos. 3,626,720 and 4,754,727 which are both assigned to the assignee of this patent and which are both incorporated herein by reference.

The U.S. Pat. No. 3,626,720 to Meachum et al includes a helical ball spline mechanism for varying the phase relation in response to selective porting of engine oil pressure to axially displace a piston therein.

The U.S. Pat. No. 4,754,727 to Hampton discloses an axially displaceable advancing plate drivingly interconnecting support and drive members via straight and angular lugs or splines. The advancing plate is also threadably mounted on a drum for axial displacement along the drum in response to relative rotation between the drum and plate. Relative rotation in one direction is provided by a spring reacting between the hub and drum and in the other direction by selective application of a frictional force for retarding rotation of the drum counter to the spring force.

In an internal combustion engine, optimization of valve opening and closing events are a function of various operating parameters such as engine speed and load. Whenever valve opening and closing events are fixed for all engine operating conditions, valve timing, by necessity, represents a design compromise which detracts from engine efficiency and all but a limited range of operating conditions. For this reason, various prior art control systems such as those described herein have been proposed which actively vary valve timing during engine operation.

The majority of successful prior art approaches, like the foregoing cited references, employ a linear actuator to effect a desired phase change which converts the linear movement of the actuator into a rotary movement of the camshaft relative to its drive pulley or gear. Such devices have certain inherent disadvantages which have prevented their being widely employed in mass production. They tend to be difficult to package in the space envelope normally provided Furthermore, their mechanical complexity has exacerbated cost and reliability.

More recently, approaches have been proposed which enable continuous control over phase change through a large range of operation. Although continuous control is desirable in certain applications, in others, a simple two position control is deemed adequate.

On certain types of cam phasers, it is necessary to cause an element on the phaser to rotate relative to the body of the device for purposes of actuation. This rotation is termed "self-actuating" if due to the fact that it uses the small engine induced speed changes of the camshaft due to individual valve events and, to a lesser degree crankshaft speed changes due to individual cylinder firing events, and does not require any form of outside energy input. Although ratchet and pawl arrangements have been proposed to provide such self-actuation, they can suffer from certain shortcomings in that any commercially feasible ratchet tooth geometry is relatively large compared to the minute camshaft instantaneous angular position variances due to individual valve events, and thus such devices can be ineffective in producing enough useful travel to effect the desired phase change. Furthermore, inherent in any pawl/ratchet arrangement, is the point of operation in which the pawl momentarily looses positive contact with an adjacent ratchet tooth whereby uncontrolled slippage and loss of phase control between the camshaft and crankshaft is possible. Finally, pawl/ratchet arrangements tend to be slow to effect a phase change, requiring many engine revolutions.

Although the present invention is described in its preferred application within an internal combustion engine for controlling phase relationship between the engine crankshaft and camshaft, this description is by way of example only, other applications being deemed self evident in view of the present specification.

BRIEF DESCRIPTION OF THE INVENTION

An object of the present invention is to provide an improved self-actuating device for varying the angular phase relation between two rotating shafts which overcomes the aforesaid shortcomings of the prior art and provides a simple, compact, inexpensive and commercially feasible device suitable for application in internal combustion engines.

Another object of the present invention is to provide a mechanism which stores up energy derived from momentary speed changes of the crankshaft and subsequently applies the stored energy to a phase changer actuating member. This arrangement permits effective utilization of high frequency, low displacement speed variations inherent in the valve train mechanism of internal combustion engines.

According to the preferred embodiment of the invention, a phase change mechanism for selectively varying the relative angular position of a camshaft with respect to a crankshaft of an internal combustion engine includes a drive member adapted for synchronous rotation with the crankshaft, a driven member adapted for synchronous rotation with the camshaft and mounted with the drive member for relative rotation about a common axis. Coupling means interlink the drive and driven members for rotation therewith, and includes an actuator element displaceable between a first position in which the coupling means effects a first phase relationship between the members and a second position in which the coupling means effects a second phase relationship between the members. Energy storage means including an inertia member operatively engaging a resilient element is provided for converting kinetic energy from transitory speed differentials between the driven member and inertia member to potential energy in said resilient element. Finally, latch means are provided adapted for driving connection between the energy storage means and actuator element for selectively imparting stored potential energy to the actuator element to effect displacement between its end positions.

More specifically, the present invention consists of two disks, a clock or spiral spring, a spring retainer cup, a spring loaded latch and one or more spring loaded ratchets or one-way sprags. The latch is pinned to the inside or first plate, and catches one of two equally spaced recesses on the inner rim of the sprocket or the like. This latch normally keeps the disk from rotating with respect to the driven member. It has a pin extending from it to one side that can be forced radially inward to cause it to disengage from the drive member.

These and other features and advantages of the preferred embodiment of the present invention are described in detail hereinbelow.

The preferred embodiment of the camshaft phase change device of the present invention is shown in the accompanying drawings.

BRIEF DESCRIPTION OF THE DRAWINGS

FIG. 1, is a cross sectional view of the preferred embodiment of the invention in its intended environment as a camshaft phase change device for an internal combustion engine looking in the direction of arrows I—I of FIG. 2;

FIG. 2, is a face view of the device looking in the direction of arrow 2 in FIG. 1 with portions of the device removed;

FIG. 3, is a cross sectional view of the device looking in the direction of arrows III—III in FIG. 1;

FIG. 4, is a cross sectional view looking in the direction of arrows IV—IV of FIG. 2;

FIG. 5, is a broken, face view of the device looking in the direction of arrows V—V of FIG. 1;

FIG. 6, is a broken, cross sectional view looking the direction of arrows VI—VI of FIG. 5;

DETAILED DESCRIPTION OF THE PREFERRED EMBODIMENT OF THE INVENTION

Figure 7:
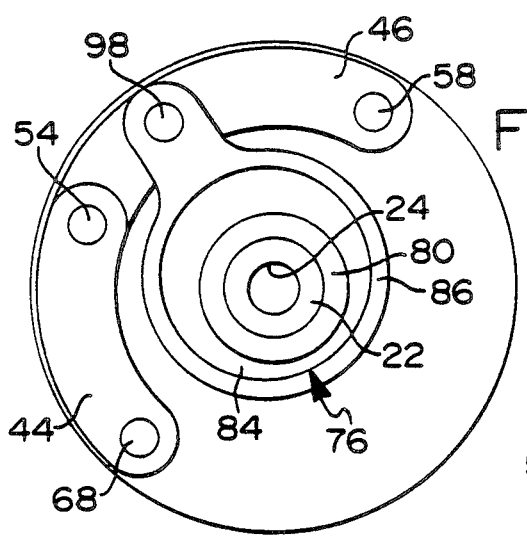
FIGS. 7-9 represent simplified charactures of a face view of the present invention corresponding with FIG. 2 and illustrating an eccentric actuator element at initial, intermediate and final positions.

Referring to FIGS. 1-4, therein is shown an angular phase change device 10 adapted to be fixed to and rotate about an axis of a camshaft 12 of an internal combustion engine partially outlined at 14. The engine includes an unshown crankshaft which rotates device 10 and camshaft 12 in a clockwise direction when the device is viewed in the direction of FIG. 2. The camshaft controls opening and closing of unshown intake and/or exhaust valves of the engine in known manner. Device 10 includes a support or driven member 16 and a drive member 18 concentrically disposed for relative rotation about a common axis.

Support member 16 includes a hub portion 20 having an axially (leftwardly as viewed in FIGS. 1 and 4) extending area of reduced thickness 22 and an axially extending through bore 24 formed therein. A flange portion 26 extends radially outwardly from the hub portion, terminating in a cylinder portion 28. Drive member 18 comprises an axially elongated cylinder portion 30 and a radially inwardly directed annular web 32. The other circumferential surface of cylinder portion 28 is journaled within the inner surface of cylinder portion 30. As best viewed in FIG. 1, the leftward most surface of flange portion 26 abuts the rightward most surface of web 32. Support member 16 and drive member 18 are retained in their illustrated positions by a snap ring 34 disposed within an inwardly opening radial slot in the inner surface of cylinder portion 30. The hub portion 20 is axially fixed to an end of the camshaft 12 by a fastener such as a bolt 36 extending through through bore 24 which prevents axial and rotational movement therebetween. The device 10 is timed to the camshaft 12 in known manner, herein a dowel pin 38 is employed.

As illustrated in FIG. 1, drive member 18 is restrained from axial and radial displacement but is permitted relative rotational freedom with respect to support member 16.

Drive member 18 substantially annular in shape and is synchronously driven in fixed angular phase relation with the unshown crankshaft in a known manner. Herein the drive is preferably via an unshown endless belt, chain or the like which mates with teeth 40 on the outer periphery of drive member 18.

As best viewed in FIGS. 2 and 4, torsional forces impressed upon drive member 18 via chain teeth 40 are transferred to support member 16 and camshaft 12 via a crescent shaped coupling assembly shown generally at 42 made up of first and second arcuate links 44,46 disposed within an annular cavity 48 defined by hub portion 20, area of reduced thickness 22, flange portion 26, web 32, cylinder portion 30 and an annular closure member 50. Annular closure member 50 is mounted to cylinder portion 30 of drive member 18 by welding or suitable fasteners (not illustrated) and is carried for rotation therewith. Closure member 50 includes a central opening 52, through which extends the lefthand most end of area of reduced thickness 22. The end of link 46 closest to link 44 is bifurcated to embrace link 44 and is affixed thereto by a dowel pin 54 which is press fit through registering apertures within the bifurcated end of link 46 and which passes freely through an intermediate registering aperture within the end of link 44. The opposed end of link 46 has an axially aligned through bore 56 slip fit upon a dowel pin 58. Dowel pin 58 is press fit within a through bore 60 formed in a localized boss 62 formed in web 32. Boss 62 extends through a circumferentially elongated clearance opening 64 within flange portion 26.

Likewise, the opposite end of link 44 has a through bore 66 formed therein within which is slip fit a dowel pin 68. Dowel pin 68 is press fit within a through bore 70 within a localized boss 72 in a location on flange portion 26 circumferentially opposite that of pin 58. Boss 72 extends leftwardly through a circumferentially elongated clearance opening 74 formed in web 32. Thus, coupling means 42 serves to interlink support member 16 and drive member 18 for rotation therewith.

An eccentric member 76 has a through bore 78 formed therein through which area of reduced thickness 22 is slip fit. As best viewed in FIG. 1, eccentric member 76 has a fixed diameter hub portion 80 extending axially between hub portion 20 of support member 16 and a snap ring 82 engaging a circumferentially outwardly opening groove within the lefthand most end of area of reduced thickness 22. Eccentric member 76 also includes a lobe or cam portion 84 of constant diameter greater than the diameter of hub portion 80 and radially offset therefrom. As illustrated, eccentric member 76 is disposed within cavity 48, is axially restrained in both directions and is free to rotate about area of reduced thickness 22. An annular crank member 86 defines a through bore 88 which slidably receives cam portion 84 of eccentric member 76. A radially outwardly extending forked flange 90 is carried by crank member 86 which embraces link 46 at a point circumferentially intermediate pins 54,60. Flange 90 defines a pair of through bores 92,94 which register with a through bore 96 within link 46. A dowel pin 98 is press fit within bores 92,94 and slip fit within bore 96. Eccentric member 76 and crank member 86 are deemed part of the coupling means, eccentric member 76 constituting an actuator element which, is free for rotation.

Figure 8:
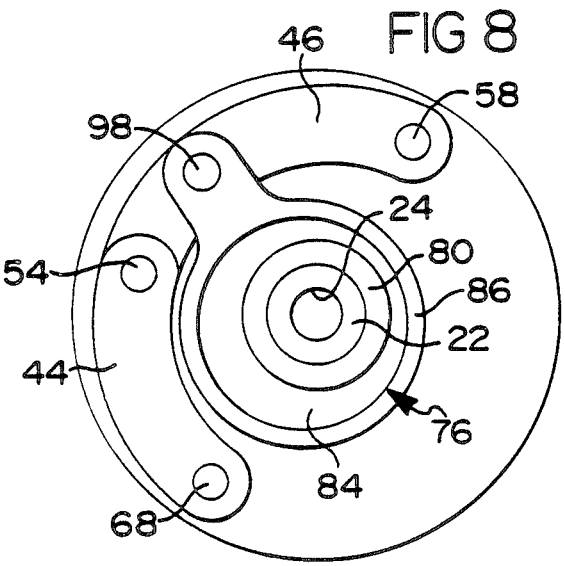
Figure 9:
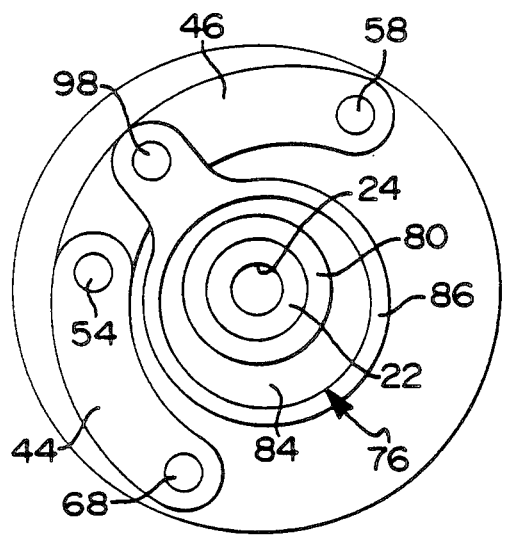

As is best illustrated in FIGS. 7-9, link 44 is free to rotate about grounded pin 68 and about floating pin 54. Likewise, link 46 is free to rotate about grounded pin 58 and floating pin 54, pins 58,68 being grounded to drive member 18 and support member 16, respectively. Crank member 86 is likewise pivotally mounted to link 46 and is carried by desmidronic action with eccentric member 76. With the configuration illustrated, radial forces tend to be very large and can tend to bend operation of eccentric member 76. Accordingly, a relatively large thrust surface is provided intermediate the eccentric member 76 and crank member to mitigate this problem.

Phasing operation of the device occurs when eccentric member 76 is rotated from an initial position, illustrated in FIG. 7, wherein pin 98 is at a maximum distance from the device axis of rotation. With the given link 44,46 geometries, in this condition, the outer circumferential surfaces of links 44,46 are closely spaced from the inner circumferential surface of cylinder portion 30 and support member 16 and drive member 18 assume a first fixed phase relationship. This can be envisioned by the angular offset between two lines drawn radially outwardly from the axis of rotation through pins 58,68, respectively. When a change in phase is desired, eccentric member 76 is rotationally repositioned. Between FIGS. 7 and 8, member 76 has been repositioned 90 degrees counter clockwise, whereby pin 98 is displaced radially inwardly and the angular offset or phase between members 16,18 is changed. As rotational displacement of eccentric member 76 continues to a maximum of 180 degree offset from that of FIG. 7, pin 98 will assume a minimal radial orientation from the axis of rotation of device 10 whereby the relative phase between members 16,18 will assume a second or maximum relationship. As rotation of eccentric member 76 continues through a full 360 degree movement, pin 98 will return radially outwardly to the position illustrated in FIG. 7. Thus, unidirectional displacement of eccentric member 76 will effect phase change operation of device 10 between both set limits.

Referring to FIGS. 1, 3, and 4, energy storage means, shown generally at 100, is illustrated. Energy storage means 100 is disposed within cavity 48 and comprises an annular flat plate 102, a clock spring 104 and annular spring retainer/inertia member 106 and a sprag member 108. It is contemplated that spiral, compression or other types of springs can be employed. Although varying from design to design, empirical selection of an optimal inertia mass is deemed critical for any given application. Furthermore, mass of eccentric member 76 and flat plate 102 also factor in inertia member mass selection.

In the configuration illustrated as the preferred embodiment, the inventors determine that a 180 degree rotation of eccentric member 76 from the position illustrated in FIG. 7 to the position illustrated in FIG. 9 will effect a net radial displacement of pin 98 of 0.25 inches (10 mm) and a corresponding 20 degree phase change. In the intended application with an internal combustion engine, FIGS. 7, 8, and 9 will represent a front view of the engine in which the crankshaft, camshaft and device 10 will be rotating in the clockwise direction, FIG. 7 represents the configuration of device 10 with the engine in the retarded condition, FIG. 9 represents the engine in the fully advanced condition and FIG. 8 represents an intermediate phasing condition.

Annular plate 102 has an axially (leftwardly as viewed in FIGS. 1 and 4) directed annular flange 110 at the radially inner most portion thereof. Flange 110 is press fit over the outer circumferential surface of hub portion 80 of eccentric member 76 whereby the radially extending portion of plate 102 abuts cam portion 84 of eccentric member 76 to establish its axial limit of travel. It is contemplated that annular plate 102 could be welded or otherwise suitable, permanently affixed to eccentric member 76 and is thus carried for rotation with eccentric member 76. Flange 110 has a single axially oriented tab 112 locally staked radially outwardly therefrom which mates with a U-shaped termination 114 on the inner end of spring 104. Spring retainer 106 has a radially extending base portion 116 and inner and outer circumferential rightwardly, axially extending flanges 118,120, respectively. Inner flange 118 abuts flange 110 of plate 102 and outer flange 120 abuts plate 102 to define a substantially closed spring cavity 122. The radially innermost circumferential surface of flange 118 is slip fit over hub portion 80 whereby spring retainer 106 is carried by eccentric member 76 but is free to rotate thereabout. Spring retainer 106 is axially restrained in one direction by plate 102 and in the other direction by closure member 50. The outer end of spring 104 terminates in a "U" configuration 124 which passes through a radial slot 126 within outer flange 120 of spring retainer 106. As configured in FIG. 3, as spring retainer 106 is rotated clockwise with respect to plate 102, spring 104 will wind up in thereby store energy.

As best viewed in FIG. 3, counter clockwise rotation of spring retainer 106 is prevented by sprag member 108 in combination with the inner circumferential surface 128 of cylinder portion 30 of drive member 18. Sprag member 108 is formed of an elongated band of spring steel or other suitable material. One end of the band is formed in a loop 130 woven through radial slots 132,134 in outer flange 120 of spring retainer 106 whereby sprag member 108 is carried for rotation with spring retainer 106. A body portion 136 of sprag member 108 is cantilevered from loop 130 generally paralleling and spaced from the outer circumferential surface of outer flange 120. The free end of body portion 136 terminates in an end portion 138 directed outwardly at an acute angle of approximately six degrees from a radial line of direction from the axis of rotation of device 10. Sprag member 108 self biases the free end of end portion 138 into constant line contact with surface 128 which is machined to be relatively smooth.

Figure 11:
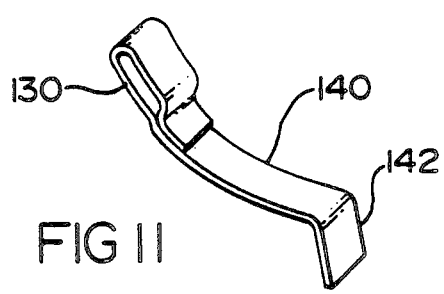
FIG. 11, is an alternative design of the sprag of FIG. 3.

Thus configured, sprag member 108 serves as a one-way clutch whereby spring retainer 106 is permitted to rotate clockwise with respect to drive member 18 but is checked from clockwise rotation with respect to drive member 18. FIG. 11 illustrates an alternative design for a sprag member 140 in which the end portion thereof 142 is straight and extremely stiff and, like end portion 138 of sprag member 108 offset from a radial line of action. End portion 138 of sprag 108 is formed in serpentine fashion to facilitate manufacturing whereby length and angular offset tolerances are rendered less critical. End portion will be significantly more resilient than end portion 142 of FIG. 11.

Referring to FIGS. 1, 3, 5 and 6, the structural details of a latch mechanism, generally designated at 144 are illustrated. Latch 144 serves to connect eccentric member 76 to drive member 18 for rotation therewith and, to selectively release eccentric member 76 for momentary rotary repositioning with respect to drive member 18.

Latch 144 is carried by plate 102 and comprises a hinge assembly made up of a latch member 146, a biasing spring 148, a pivot pin 150 and mounting structure 152. Structure 152 is integrally formed from the radially outermost portion of plate 102 and, as is best viewed in FIG. 1, comprises a box or U-shaped configuration composed of an axially (leftwardly) extending portion 154, a radially outwardly extending portion 156 and an axially (rightwardly) extending portion 158. Pivot pin 150 is press fit within radially aligned apertures within portions 154,158 to provide a hinge point for latch member 146. An intermediate portion of latch member 146 has a box configuration 160 for receiving one end of spring 148. The other end of spring 148 bears against plate 102 to bias latch member 146 into its illustrated position. The free end 162 of latch 146 is in rotational alignment with and extends within one of two opposed identical slots or apertures 164 (only one illustrated) within enclosure member 50 whenever plate 102 and drive member 18 are in one of two predetermined opposed relative angular positions. When end 162 of latch member 146 is within an aperture 164, latch mechanism 144 assures that plate 102 and thus eccentric member 76 are locked for rotation in unison with drive member 18.

A release member 166 formed of an elongated length of spring steel or other suitable material has one end permanently affixed to the outer surface of closure member 50 by welding, rivets or other suitable means. Release member 166 has an intermediate ramp portion which angularly diverges away from closure member 150, terminating in a contact portion 170.

An actuator such as a solenoid 172 mounted to a grounded portion of the host vehicle by appropriate mounting structure 174 includes a plunger 176 axially displaceable upon receipt of an actuation signal from a logic device 178 such as a relay in response to an input from one or more vehicle sensors 180. Such inputs typically are derived from engine speed and load logic within the host vehicle computer. Upon receiving a control signal, plunger 176 is displaced outwardly from its illustrated position. Actuator 172 is positioned in rotational alignment with release member 166 whereby when plunger 176 is in its illustrated retracted position, release member 166 will pass thereby. However, when actuator 172 is actuated and plunger 176 is displaced rightwardly as viewed in FIG. 6, as drive member 18 continues to rotate and plunger 176 will contact the ramp portion 168 of release member 166, displacing contact portion 170 briefly into aperture 164 as it passes thereby to displace end 162 of latch member 146 clockwise, out of engagement with closure member 50. In FIG. 6, the direction of rotation of drive member 18 is designated by arrow 182.

Although only one latch aperture 164 is illustrated, it is contemplated that two opposed apertures 164 would be provided whereby only 180 degrees of rotation is required from initial release of latch mechanism 144 until it is reset as illustrated in FIG. 6.

Two sets of stops are provided to establish a limited range of rotational freedom between spring retainer 106 and annular plate. Positioning of the stops prevents sprag 108 from contacting latch mechanism 144 and limits the amount of energy (wind up) that can be stored in spring 104. As best viewed in FIG. 3, each set of stops comprises an abutment member 184,186 attached to outer flange 120 such as by welding and extending radially outwardly therefrom, and an associated tab member 188,190 integrally formed from annular plate 102 and axially extending (toward the view in FIG. 3) therefrom. Abutment member 184 and tab 188 coact to limit clockwise rotation of spring retainer 104. Likewise, abutment member 186 and tab 190 coact to limit counter clockwise rotation (as illustrated) of spring retainer 104.

Figure 10A:
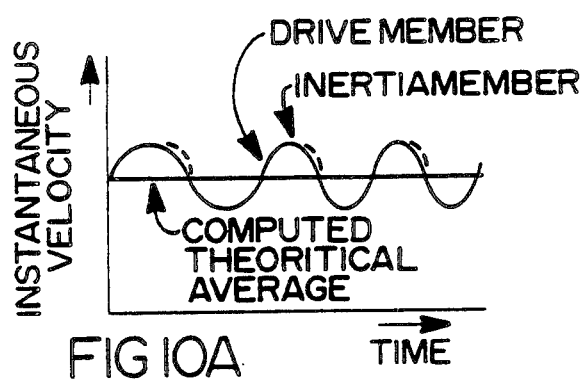
FIGS. 10A and B are a graphical depictions of instantaneous velocity of the drive and inertia members as well as stored energy accumulation over several typical camshaft torsional variations.
Figure 10B:
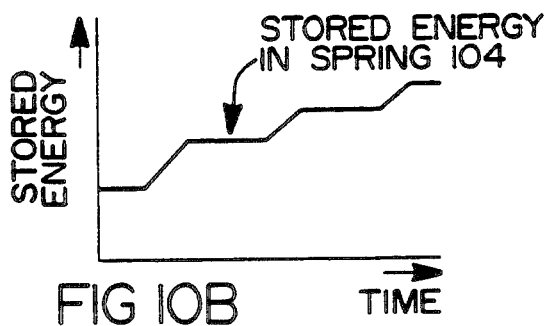

Referring to FIG. 10, a graphical representation of the respective instantaneous rotational speed variations between drive member 18 and the spring retainer/inertia member 106 is illustrated. As will become apparent in the following description of operation, the slight rotational variations between the elements is the source of energy that is converted to stored energy within spring 104 for subsequent utilization.

In operation, device 10 serves to store energy and to periodically release said energy to reposition eccentric member 76 and thereby alter the phasing between support member 16 and drive member 18 as was described herein above. During normal engine operation, the camshaft 12 speeds up or slows down, due to the action of the cam followers on the camshaft as well as crankshaft speed variations induced through the belt/chain. When these forces cause an acceleration of drive member 18, which is rotating in the clockwise direction as viewed in FIG. 3, pawl 108 will cause spring retainer 106 to follow drive member 18. However, whenever drive member 18 decelerates, the inertia of spring retainer 106 will momentarily cause the deceleration of spring retainer 106 to lag that of drive member 18. During that time, pawl 108 will slip with respect to inner circumferential surface 128 whereby retainer 106 will be slightly rotationally repositioned clockwise with respect to drive member 18. This, in turn, will tend to incrementally wind up spring 104. The biasing effect of spring 104 is at all times restrained by pawl 108. Thus, over time, pawl 108 tends to walk clockwise with respect to drive member 18 until it contacts stop 184,188. At that time, spring 104 has accumulated enough potential energy to rotate eccentric member 76 upon the next actuation of solenoid 172. When latch mechanism 144 is triggered, device 10 alters the phase as described above between the camshaft 12 and the crankshaft and maintains that new phase relationship until the next actuation signal is generated.

It is to be understood that the invention has been described with reference to a specific embodiment and variations to provide the features and advantages previously described and that such embodiment is susceptible to modification as will be apparent to those skilled in the art. Accordingly, the foregoing is not to be construed in a limiting sense.

What is claimed is:

1. A device for varying the relative angular position of two rotating shafts including concentric drive and driven members adapted for respective synchronous rotation with said shafts and coupling means interlinking said drive and driven members for rotation therewith including an actuator element displaceable between a first position in which said coupling means effects a first phase relationship between said shafts and a second position in which said coupling means effects a second phase relationship between said members: characterized in that said device comprises energy storage means including an inertia member operatively engaging a resilient element for converting kinetic energy to potential energy in said resilient element during transitory speed differentials between said driven and inertia members; and latch means operable to lock said energy storage means to said actuator element for selectively imparting stored potential energy to said actuator element to effect displacement thereof between said positions.

2. A phase change mechanism for selectively varying the relative angular position of a camshaft with respect to a crankshaft of an internal combustion engine, said phase change mechanism comprising:
a drive member adapted for synchronous rotation with said crankshaft;
a driven member adapted for synchronous rotation with said camshaft, said drive member and driven member mounted for relative rotation about a common axis;
coupling means interlinking said drive and driven members for rotation therewith including an actuator element displaceable between a first position in which said coupling means effects a first phase relationship between said members and a second position in which said coupling means effects a second phase relationship between said members;
energy storage means including an inertia member operatively engaging a resilient element for converting relative rotation between said driven and inertia member to potential energy in said resilient element; and
latch means operable to lock said energy storage means to said actuator element for selectively imparting stored potential energy to said actuator element to effect displacement thereof between said positions.

3. The device of claim 2, wherein said inertia member is disposed for rotation about said axis and said resilient element comprises spring means reacting between said drive member and actuator element.

4. The device of claim 3, wherein said energy storage means further comprises one-way clutch means interconnecting said drive member and inertia member to permit relative rotation therebetween in one rotational sense and prohibiting relative rotation in an opposite rotational sense.

5. The device of claim 4, wherein said one-way clutch means comprises a sprag.

6. The device of claim 4, wherein said one-way clutch means comprises a ratchet.

7. The device of claim 4, wherein said latch means comprises a catch member operatively engaging said drive member and actuator element to effect synchronous rotation in a latched state and relative rotational freedom in an unlatched state.

8. The device of claim 7, wherein said latch means further comprises release operative to displace said catch member from a latched position to a release position in response to a control signal.

9. An annular phase change device comprising:
support means adapted to be fixed to and rotate about an axis of a first shaft;
drive means journaled on the support means and secured thereto against axial movement, said drive means adapted to be driven by a second shaft;
advancing means including means drivingly interconnecting the support and drive means and operative in response to displacement of an actuator element to effect a limited relative rotation of the support and drive member;
energy storage means including an inertia member operatively engaging a resilient element for converting relative rotation between said drive means and inertia member to potential energy in said resilient element; and
latch means operable to lock said energy storage means to said actuator element for selectively imparting stored potential energy to said actuator element to effect displacement thereof between said positions.

10. The device of claim 9, wherein said support means includes an axially extending hub portion having an outer circumferential surface receiving the radially inner portion of an axially extending drum portion of said drive means.

11. The device of claim 10, wherein the outer circumferential surface of said drum portion defines means for engaging an endless belt drivingly interconnecting said drum portion and second shaft for synchronous rotation.

12. The device of claim 10, wherein said drive means includes a closure member concentrically disposed about said axis and defining a substantially closed annular recess in combination with said portion and support means.

13. The device of claim 12, wherein said energy storage means is disposed within said closed annular recess.

14. The device of claim 13, wherein said inertia member comprises a first annular half spring retainer disposed for rotation about said axis within said annular recess in opposed cooperative relationship with a second annular half spring retainer carried by said actuator element, said spring retainers operatively engaging opposed ends of said resilient element.

15. The device of claim 14, wherein said resilient element comprises a spring substantially enclosed by said spring retainers having an inner end thereof engaging one of said retainers and an outer end engaging the other of said retainers.

* * * * *